(No Model.) 2 Sheets—Sheet 1.
T. MURPHY.
FIRE ENGINE HARNESS.
No. 552,668. Patented Jan. 7, 1896.
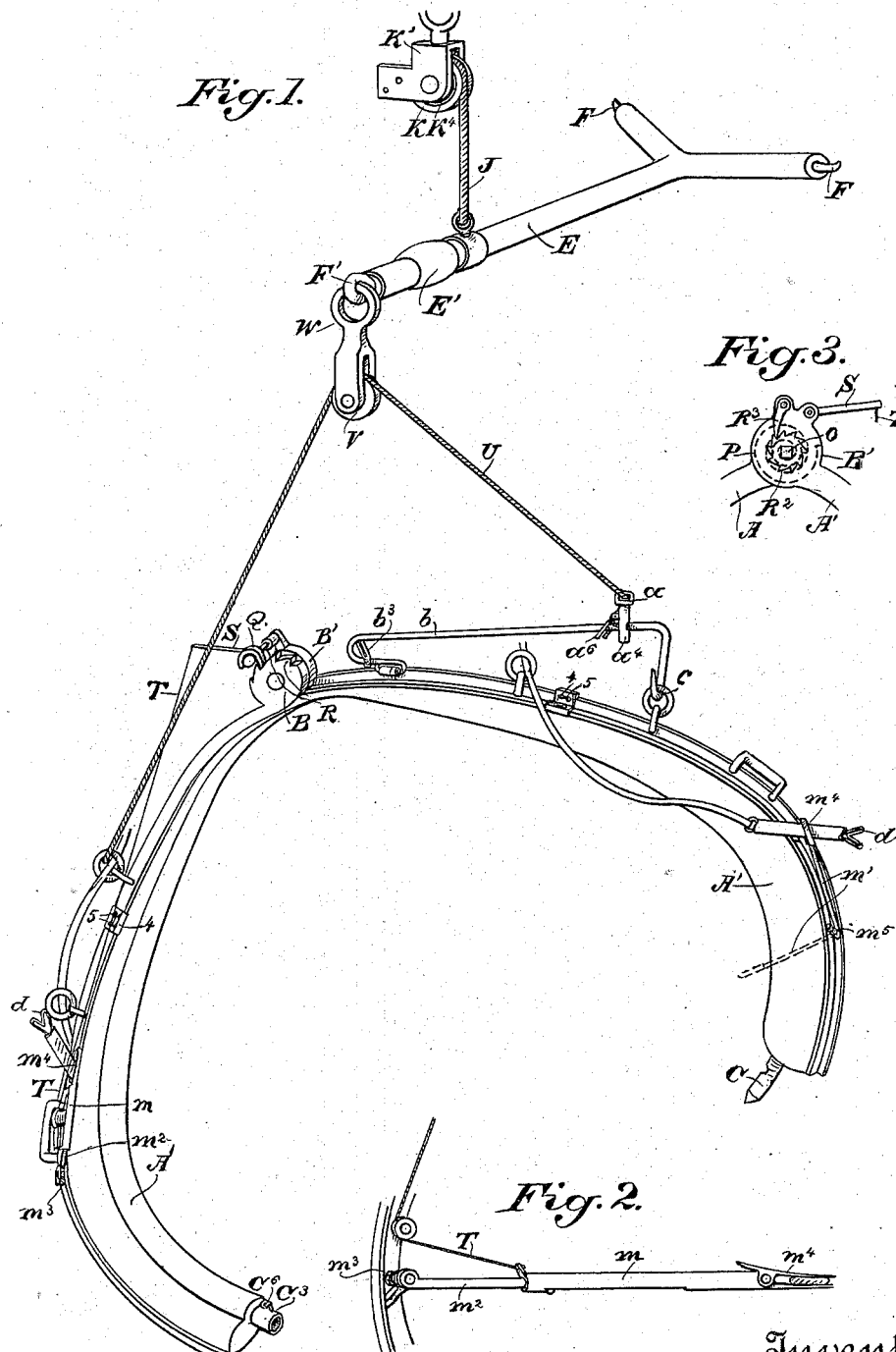
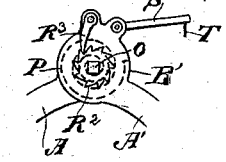
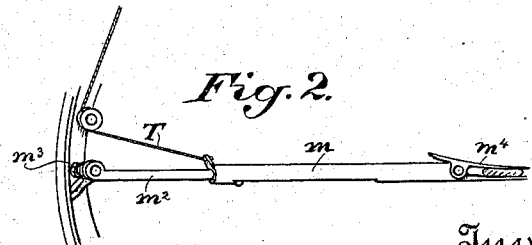

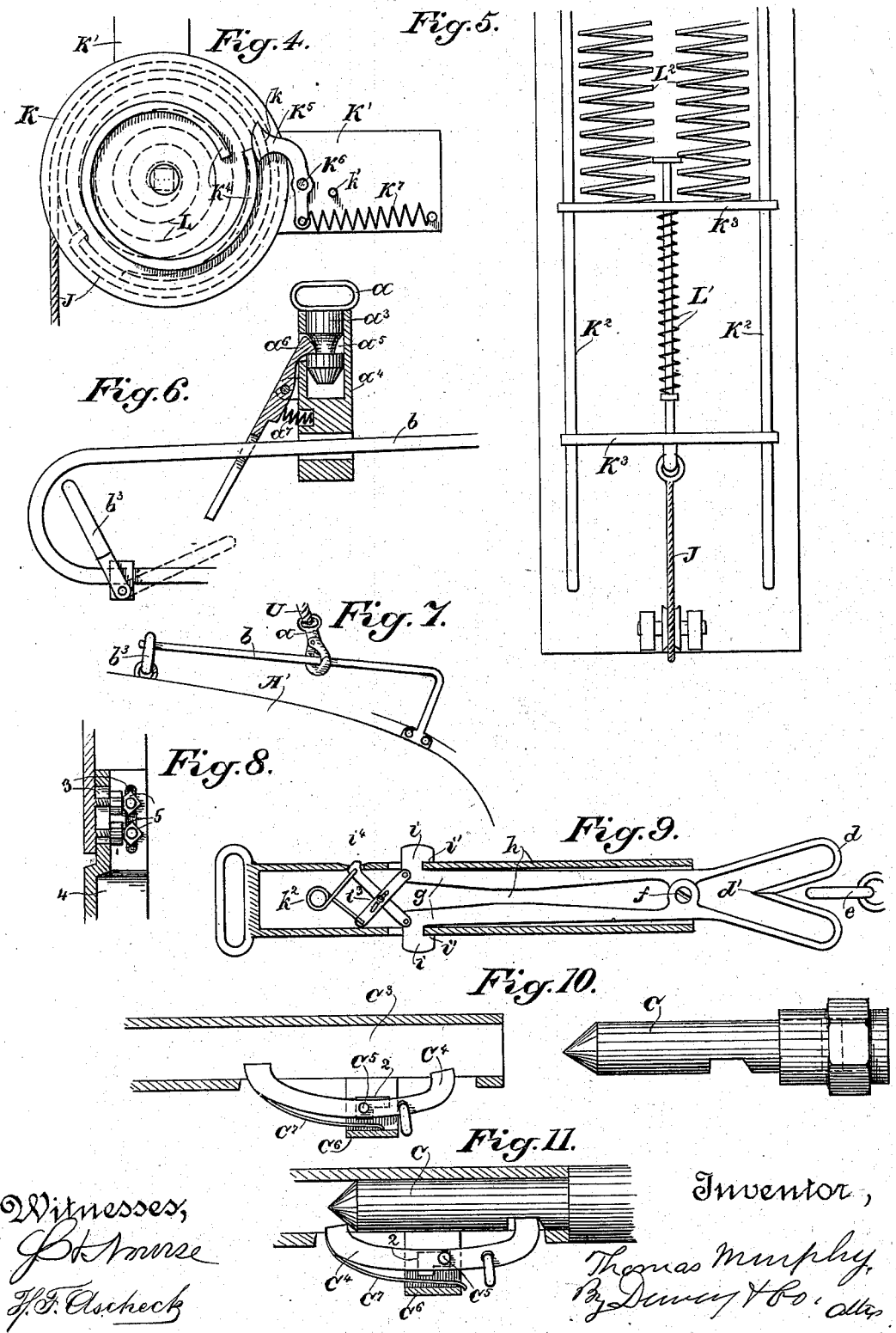

UNITED STATES PATENT OFFICE.

THOMAS MURPHY, OF SAN FRANCISCO, CALIFORNIA.

FIRE-ENGINE HARNESS.

SPECIFICATION forming part of Letters Patent No. 552,668, dated January 7, 1896.

Application filed May 27, 1895. Serial No. 550,842. (No model.)

*To all whom it may concern:*

Be it known that I, THOMAS MURPHY, a citizen of the United States, residing in the city and county of San Francisco, State of California, have invented an Improvement in Fire-Engine Harness; and I hereby declare the following to be a full, clear, and exact description of the same.

My invention relates to a harness and mechanism connected therewith whereby the harness is rapidly disengaged from the suspending devices and is automatically secured upon the horses.

In a former patent, No. 505,410, issued to me September 19, 1893, I have shown a harness of the same general description; and my present invention consists in certain improvements and details of construction, which will be more fully explained by reference to the accompanying drawings, in which—

Figure 1 is a general view of the harness. Fig. 2 is a detail of the inner snap-hook holder. Fig. 3 is a rear view of the collar-hinge. Fig. 4 is a view of the braking device on the suspension-pulley. Fig. 5 is a modification for suspending the harness. Fig. 6 is a detail of the attachment of the suspending-rope to the elevated half of the collar. Fig. 7 is a modification of the same. Fig. 8 is a detail of the hame adjustment. Fig. 9 shows my snap-hook in section. Figs. 10 and 11 are details of the locking device on the lower halves of the collar.

In my present invention the collars consist of two parts A and A' hinged together at B. The lower ends of the inner halves A A' of the collars are connected with the pole of the engine by the pole-straps $d$, so that the inner portions of the collars remain approximately in one position, while the outer portions are turned upwardly high enough to allow the horses to pass beneath and take their position alongside of the pole and beneath the harness.

The suspending apparatus consists of a Y-shaped frame E, having points F projecting from each of the ends of the Y.

The collars and front portions of the harness are suspended from the link or projection F', which extends from the shank or body of the Y, and the breeching and rear portion of the harness are suspended from the ends of the two rear forked portions, while the whole frame is suspended by a rope J from the elastic suspending device directly above the apparatus. This latter device is designed to raise the suspending-yokes out of the way as soon as the harnesses are released therefrom, to allow the engine to pass beneath.

K is a pulley journaled within an outer casing K', and around this pulley the rope J passes and is connected with the Y-shaped frame E at the proper point, so that the front and rear ends of the frame will hang approximately horizontal when the harness is detached therefrom.

The front end of the harness being much heavier than the rear portion, the rope J will necessarily be attached to the shank of the frame E nearer to the front end, and in order to counterbalance the surplus weight and leverage of the rear portion of the yoke I have shown weights E' fixed in front of the rope.

I have shown two forms of suspending device. In one of these I employ vertical guide-rods $K^2$, upon which a slide $K^3$ is adapted to travel. The rope J is connected with the lower part of this slide, and the slide itself is suspended by a spring L', which, in turn, is connected with spiral springs $L^2$ with an intermediate slide, so that the springs act in unison. The springs $L^2$ are sufficiently strong to support the weight of the harness, and the spring L' being weaker will be first drawn down to the limit of its extension by the weight of the yoke, after which the springs $L^2$ will be extended. A non-extensible rod or connection between the slides $K^3$ limits the extension of the spring L' and connects the slides so that the pull then comes on the springs $L^2$. Whenever the harness is released from the apparatus, the springs act successively, the springs $L^2$ being first drawn up, while the spring L' which supports the yoke or frame E yields to the inertia of the movement, and thus prevents the yoke or frame from being jerked up suddenly to the ceiling when the harness is released. In the other form I have shown the pulley K journaled within the outer casing K', as shown in my former patent, and having within it a coiled spring L, one end of which is connected with the axle or shaft and the other with the pulley so that when the weight of the harness is supported from the rope J the spring will be coiled by the rotation of the pulley. The shaft is turnable to coil the spring more or less and regulate its tension, and it is held at any point by a pawl and ratchet similar to one hereinafter described. Within the opposite side of the casing is a spirally-arranged flange $K^4$.

$K^5$ is a lever fulcrumed, as shown at $K^6$, so that the end $K^5$ will press against the periphery of the spiral flange $K^4$.

$K^7$ is a spring acting upon the opposite arm of the lever with sufficient tension to press the arm $K^5$ against the flange $K^4$, and thus prevent too rapid an unwinding of the spring when the harness is released. When the team returns, and the harnesses are to be again suspended, the yoke is pulled down by a cord or equivalent device. The arm $K^5$ follows around the periphery of the spiral as the pulley turns until it reaches the inner end of the spiral. At this point the outer end of the spiral enters a slot or channel $k$ which is made in the end of the arm $K^5$, and this prevents the spring $K^7$ from forcing the arm $K^5$ inwardly after it leaves the end of the spiral $K^4$. The other end of the lever-arm is arrested against a pin $k'$ which acts as a stop, and the slot $k$ thus binds upon the spiral flange, and finally arrests the movement and gradually brings the parts to a state of rest after the yoke E has been raised to a sufficient distance to clear the engine and allow it to pass out beneath.

The hinge device by which the top of the collar is connected together consists of a two-part case B B' containing a spiral spring P, by which, when the two parts of the collar are free to move, they will be closed together at the bottom. They are securely held open by ratchet-teeth R formed on one part of the casing and a pawl Q adapted to engage these teeth when the collars are opened. This pawl is disengaged from the teeth R by the projecting lever-arm S extending outwardly from it and fulcrumed, as shown, and a cord T which extends downwardly from the lever-arm to the point where it is connected with the device which holds the bridle snap-hook to the inner side of the collar, so that when the horses are in place the sleeve $m$ sliding outward on the rod $m^2$ pulls on the cord T and disengages the pawl, and the action of the spring closes the lower parts of the collar together beneath the necks of the horses. A spring $m^3$ acts to normally hold the bar $m^2$ and the sleeve $m$ up alongside the collar after the snap-hook has been disengaged. Within the case B is another ratchet $R^2$, secured to the shaft O, to which one end of the spring is attached, and the outer end of this shaft O, projecting through the side of the case, is adapted to receive a wrench or other device by which it may be turned to wind up the spring. By reason of this arrangement the shaft O may be turned to coil the spring, while the pawl and ratchet hold it to produce a variable tension to close the parts of the collar when released. When the spring is coiled to a sufficient tension, it is held in place by a pawl $R^3$.

The collars are suspended from the front of the yoke E by a cord or chain U which passes around a pulley V, the frame of which has an eye or ring W which is attached to the front arm of the yoke E and serves to suspend it. One end of the cord U is attached to the inner portion of the collar A, and the other end extending down from the pulley V is connected with an eye $a$. This eye has a stem $a^3$ adapted to fit into a sleeve $a^4$, and having a groove or channel $a^5$ made in it. Upon the side of the sleeve $a^4$ is fulcrumed a pawl-lever $a^6$, the upper end of which enters a slot in the side of the sleeve, so that its point engages the groove or channel $a^5$, and this locks the shank $a^3$ in place while it is in engagement. A spring $a^7$ retains this lever in the position while in its normal condition. A hole is made through the lower part of the sleeve $a^4$, and this is adapted to slide upon a rod or bar $b$, one end of which is connected with the collar at some distance from the hinge-joint B, by means of a hook or attaching device, (shown at $c$.) This bar $b$ is bent, as shown, and the opposite end is connected with the collar near the hinge-joint B.

When the outer portion of the collar is thrown up, the part A' being suspended to allow the horse to pass beneath it, the sliding sleeve $a^4$ will be near the outer end of the bar $b$; but whenever the pawl Q is disengaged to allow the two parts of the collar to close this sleeve $a^4$ will slide toward the inner end of the bar $b$. Upon this inner end of the bar $b$ is fixed a swivel loop or device $b^3$ in such a position that when the sleeve $a^4$ slides toward this end of the bar $b$ the end of the lever $a^6$ will strike against the link $b^3$, and this will disengage the upper hook or pawl portion from the groove in the pin $a^3$, thus allowing the cord U and the pin $a^3$ to be drawn up through the pulley V, thus disengaging it and the collar from the suspending mechanism. When the harness is to be cleaned, the link $b^3$ is turned down out of the way and the harness can then be suspended and moved about without being disengaged. As the pulley V is, in this case, not disengaged from the end of the yoke E, all that is left to fall upon the back of the horse is the cord U and this small suspending-pin $a^3$.

When the apparatus is to be again put in use to suspend the harness, it is only necessary to pull the yoke down by a cord and pass the pin $a^3$ and the cord U over the pulley V and to again engage the pin $a^3$ with the latch-lever $a^6$, the sleeve or part $a^4$ sliding to near the outer end of the rod $b$, as previously described, when the collar is opened and in its suspended position.

The operation of disengaging the harness from the suspending-yoke is then as follows: When the cords U are disengaged to allow the collars to drop, the action of the suspending mechanism above pulls the cord J and the front part of the yoke is pulled up, while the rear portion remains essentially stationary. This tilts the yoke so that the breeching slips off the pins F at the rear and the counterbalance-weights E' thus act to bring the yoke into a horizontal position.

In order to lock the two lower meeting ends of the collar together, I have shown a peculiar latch. This latch consists of a pin C fixed to one portion of the collar and adapted to enter a tube $C^3$ fixed to the other portion of the collar. The part C has a slot or depression made in the top, and the part $C^3$ is slotted on top and has a latch $C^4$ swiveled so as to tilt upon a central pin $C^5$ in a standard $C^6$, and this latch is acted upon by a spring $C^7$ which tends to press the rear end of it down into the interior of the tubular portion. The part C having a tapered point or end, when the two are brought together this taper point passes beneath the head of the latch, and as it continues to pass into the sleeve it also passes beneath the rear portion of the latch, thus tilting that end up so that the tendency of the spring then is to press down the head or front portion, and when the slot in the pin C has arrived beneath the head the latter drops into it and the two are thus latched together. The swivel-pin $C^5$, upon which the latch turns, passes through an L-shaped slot 2 made in the standard, and when this pin is in line with the longer vertical portion of this slot the latch may be lifted up so as to disengage it from the slot in the part C. As soon as the latch has dropped into the slot, and the two parts are locked together, the action of the spring and the pull on the latch mechanism are such as to force the pin along the horizontal portion of the slot 2, where it is practically locked so that the latch cannot be lifted out while in this position. This prevents any movement of the parts from disengaging the two parts of the collar. When it is desired to disengage the two parts, it is only necessary to push the latch back until the pin $C^5$ is in line with the longer vertical portion of the slot, when the head of the latch may be lifted out of the slot in the part C and the latter drawn out and disengaged.

In order to adjust the length of the collars to larger or smaller necks of horses I have shown them made in two parts, Fig. 8, the lower portions being slotted, as shown at 3, and the upper parts, being made of an L-shaped channel-iron, as shown at 4, are adapted to slide over the correspondingly-shaped portions of the lower parts, while bolts passing through the slots 3 and having nuts 5 upon them serve to lock the parts together wherever it may be desired.

The snap-hooks by which the reins are connected with the ring e are made of heart shape, as shown at d, the inner points d' forming a central depression at the top of the heart, so that the ring e may be introduced between these meeting and separable ends. The two parts are fulcrumed, as shown at f, and the inner ends extending into the outer casing h have outwardly-turned lugs i projecting through slots in the sides of the case. The snap-hooks, lever-arms and lugs are slidable longitudinally within the case. The lugs i have projections or hooks i', which when the snap-hook is closed together at d' and the device pushed forward will rest upon the outer side of the case h, and thus prevent the lugs i from being pressed inwardly and the snap-hook opened. This is the position of the parts when the rings are attached and the horses being driven, and it prevents any accidental disengagement. In order to hold these latches i i' in their forward position, I have shown a spring $k^2$, the ends of which are connected with the rear ends of the crossed levers $i^3$, and the front ends of these levers are pivoted to the rear ends of the levers g, as shown. One of these levers $i^3$ has a lug $i^4$, which when the snap-hooks are drawn forward will be forced outward by the spring $k^2$ through a slot in the casing. When the lugs i i' are in their forward position so as to lock the parts, this lug $i^4$ falls into the slot and thus prevents the spring and lugs from being drawn back. Whenever it is desired to release the reins, this lug is pressed in until it is disengaged from the opening or slot in the case h, and the levers g and the snap-hook are drawn back until the projecting parts i' are clear of the sides of the case, when the lugs i may then be pressed inwardly and the outer ends of the snap-hook opened to allow the ring e to be disengaged. The inner snap-hook is held in spring clamps or jaws $m^4$ on the sliding sleeve m previously described. The outer snap-hook is attached to an arm m', which is hinged to the collar at an angle, as shown at $m^5$, so that when the snap-hook is disengaged and allowed to drop down this arm also drops down and outwardly away from the collar by gravitation. A light spring at the joint $m^5$ acts with sufficient power to hold the arm m' folded up against the collar when this portion is turned up, but the weight of the arm m' is sufficient to overcome the tension of the spring when the collar is closed, and to throw the bar down, as previously described.

Fig. 7 shows the end of the bar b entering the swivel-ring $b^3$, and the ring a of the rope U sliding directly upon the bar. When the collar is closed the ring a sliding upon the bar strikes the ring $b^3$, pushes it off the bar, and is free. The harness is suspended for washing directly from the ring $b^3$.

Having thus described my invention, what I claim as new, and desire to secure by Letters Patent, is—

1. In a harness, the two part collars hinged together at the top adapted to close at the bottom, a latching mechanism consisting of the slotted pin attached to one portion of the collar, and a longitudinally movable, centrally-fulcrumed spring-actuated oscillating latch lever attached to the other portion, and adapted to engage the slotted portion.

2. In a harness, the two part collars hinged together at the top and adapted to close at the bottom having a locking device consisting of a slotted pointed pin projecting from one face of the collar, a tube into which said portion slides, attached to the other portion, a slidably mounted D-shaped centrally fulcrumed latch having a head upon the forward end adapted to engage the slot in the entering pin, a spring by which the latch is normally depressed, said spring acting to depress the rear end of the latch while the pin is passing beneath the locking head, and to depress the locking head so as to engage the slot when the pin passes beneath the rear end of the latch.

3. In a harness, a two-part collar hinged at the top adapted to close and lock at the bottom, a locking device consisting of a slotted pointed pin projecting from one portion of the collar, a tubular socket fixed to the other portion into which said pin enters, a latch having a head upon the front end adapted to engage the slot in the entering pin, a fulcrum pin passing through the central portion of the latch and loosely movable in an L-shaped slot in the standard projecting above the tube, said pin being movable so as to stand in line with the vertical portion of the slot when the locking pin is to be entered or removed from the tube, and lying within the horizontal portion of the slot so as to form a lock when the parts are connected together.

4. In a harness the two-part collars hinged together at the top, adapted to close and lock at the bottom, a pawl and ratchet mechanism for holding the parts of the collars normally open, mechanism for automatically closing the parts of the collars when said retaining mechanism is disengaged, a suspending frame with a pulley at the front, a cord passing over said pulley having one end attached to one part of the collar, and the other connected with the other portion of the collar by a disengaging device, and mechanism whereby said device is disengaged to allow the collar to be released from the suspending device.

5. In a harness, the two-part collars hinged together at the top and adapted to close and lock at the bottom and mechanism for retaining them in a normally open position, mechanism for disengaging said holding device and closing and locking the collars, a suspending frame with a pulley, a cord having one end attached to one part of the collar passing over said pulley, a locking pin connected with the opposite end of said cord adapted to enter a tubular slide, a latch by which the pin is engaged and locked to the slide, a rod or bar extending from the central portion of the collar outwardly upon which said slide is movable so that the slide remains at the outer end of the bar when the collar is open, and moves to the inner end when the collar is closed, and a device whereby the latch is disengaged and the pin and cord allowed to pass around the pulley to disengage the collars from the suspending device.

6. In a harness, the two part collars hinged together at the top and adapted to close and lock at the bottom, a yoke or frame from which the collars are suspended with the outer portion normally open and raised, mechanism for disengaging the collars from said frame, and closing and locking them upon the horse's neck, a suspending cord connected with the yoke, a spring-actuated device connected with said cord for suspending the weight of the harness and yoke and means for regulating the action of the spring-actuated device and the ascent of the yoke when the harness is removed therefrom, to prevent a too rapid action of the yoke.

7. In a harness the two-part collars hinged together at the top and adapted to close and lock at the bottom, mechanism for holding them in a normally open position, mechanism for disengaging said holding device and closing and locking the collars, a suspending yoke with an elastic retracting device, pins on the rear of said yoke by which the breeching of the harness is held up, a pulley at the front with a cord having one end attached to one side of the collar, passing thence over the pulley, and connected with a disengaging latch mechanism, a rod or bar fixed to the movable part of the collar, upon which the latch mechanism is slidable, so as to remain at the outer part when the collar is open and to move toward the inner end when it is closed, and a swivel stop at the inner end which is normally turned up to disengage the latch and allow the harness to fall, and which may be turned out of the path of the latch to allow the harness to remain suspended.

8. In a harness, two-part collars hinged together at the top and adapted to close and lock at the bottom, mechanism for retaining them normally in an open position and mechanism for disengaging the holding device, and closing and locking the collars, a counter-balanced yoke with spring-actuated suspending devices, pins at the rear of the yoke from which the breeching of the harness is suspended, the spring suspending device acting to draw the front of the yoke upward when the collar has been disengaged therefrom, and thus tilt it until the breeching slips off the rear end, the counter-balance acting to return the yoke to an approximately horizontal position when freed from the harness.

In witness whereof I have hereunto set my hand.

THOMAS MURPHY.

Witnesses:
S. H. NOURSE,
H. F. ASCHECK.